US012592999B2

(12) United States Patent
Sasaki

(10) Patent No.: US 12,592,999 B2
(45) Date of Patent: Mar. 31, 2026

(54) INFORMATION PROCESSING APPARATUS, DISTRIBUTED PROCESSING SYSTEM, NON-TRANSITORY COMPUTER READABLE MEDIUM STORING PROGRAM, AND DISTRIBUTED PROCESSING METHOD FOR ACQUIRING A PROCESSING RESULT OF PROCESSING ACCORDING TO AN EXECUTION INSTRUCTION FOR THE PROCESSING

(71) Applicant: FUJIFILM Business Innovation Corp., Tokyo (JP)

(72) Inventor: Hirofumi Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 703 days.

(21) Appl. No.: 17/873,163

(22) Filed: Jul. 26, 2022

(65) Prior Publication Data

US 2023/0291859 A1 Sep. 14, 2023

(30) Foreign Application Priority Data

Mar. 8, 2022 (JP) ................................ 2022-035543

(51) Int. Cl.
*H04N 1/32* (2006.01)
*H04N 1/00* (2006.01)

(52) U.S. Cl.
CPC ..... *H04N 1/32678* (2013.01); *H04N 1/00244* (2013.01); *H04N 1/0097* (2013.01); *H04N 1/32662* (2013.01)

(58) Field of Classification Search
None
See application file for complete search history.

(56) References Cited

U.S. PATENT DOCUMENTS

2010/0230493 A1* 9/2010 Akiyama ................. G06K 7/14 235/437
2011/0145351 A1* 6/2011 Lee ....................... G06F 3/1247 709/206

(Continued)

FOREIGN PATENT DOCUMENTS

JP H07129417 5/1995
JP 2013077129 4/2013

(Continued)

OTHER PUBLICATIONS

"Notice of Reasons for Refusal of Japan Counterpart Application", issued on Dec. 9, 2025, with English translation thereof, pp. 1-8.

*Primary Examiner* — Abderrahim Merouan
*Assistant Examiner* — Pawan Dhingra
(74) *Attorney, Agent, or Firm* — JCIPRNET

(57) ABSTRACT

An information processing apparatus includes a processor configured to provide an execution instruction for processing to a server that executes distributed processing, acquire a processing result of the processing, which is distributed to the server in the distributed processing, from each of servers, in a case where a predetermined condition is satisfied without acquiring the processing result for respective processing related to the distributed processing, provide a notification indicating that the processing result has not been acquired to each server that executes the distributed processing, and after the notification, among the servers that execute the distributed processing, acquire the processing result from a different server that is different from the server to which the processing, which is related to the processing result that has not been acquired in a case where the condition is satisfied, is distributed.

15 Claims, 7 Drawing Sheets

(56) References Cited

U.S. PATENT DOCUMENTS

| | | | | |
|---|---|---|---|---|
| 2011/0199640 | A1* | 8/2011 | Shirai | G06F 3/1257 358/1.15 |
| 2011/0205585 | A1* | 8/2011 | Mihara | G06F 3/1272 358/1.15 |
| 2012/0092721 | A1* | 4/2012 | Jaudon | G06F 3/1225 358/1.15 |
| 2012/0127524 | A1* | 5/2012 | Hagiwara | G06F 11/3006 358/1.15 |
| 2012/0200888 | A1* | 8/2012 | Kato | G06F 3/129 358/1.15 |
| 2012/0229844 | A1* | 9/2012 | Yada | G06F 3/1204 358/1.15 |
| 2012/0243026 | A1* | 9/2012 | Waller | G06F 3/1207 358/1.15 |
| 2013/0003106 | A1* | 1/2013 | Nishida | G06F 3/1222 358/1.14 |
| 2013/0016377 | A1* | 1/2013 | Meiyappan | G06F 3/1285 358/1.14 |
| 2014/0240748 | A1* | 8/2014 | Ohno | G03G 21/02 358/1.14 |
| 2014/0317635 | A1 | 10/2014 | Konno et al. | |
| 2019/0042285 | A1 | 2/2019 | Shin | |
| 2022/0214910 | A1* | 7/2022 | Honda | G06Q 10/06316 |
| 2023/0291791 | A1* | 9/2023 | Sasaki | H04L 67/1001 |

FOREIGN PATENT DOCUMENTS

| | | |
|---|---|---|
| JP | 2018535464 | 11/2018 |
| WO | 2013076775 | 5/2013 |

* cited by examiner

INFORMATION PROCESSING APPARATUS, DISTRIBUTED PROCESSING SYSTEM, NON-TRANSITORY COMPUTER READABLE MEDIUM STORING PROGRAM, AND DISTRIBUTED PROCESSING METHOD FOR ACQUIRING A PROCESSING RESULT OF PROCESSING ACCORDING TO AN EXECUTION INSTRUCTION FOR THE PROCESSING

CROSS-REFERENCE TO RELATED APPLICATIONS

This application is based on and claims priority under 35 USC 119 from Japanese Patent Application No. 2022-035543 filed Mar. 8, 2022.

BACKGROUND

(i) Technical Field

The present invention relates to an information processing apparatus, a distributed processing system, a non-transitory computer readable medium storing a program, and an information processing method.

(ii) Related Art

In data processing, in a case where distributed processing that uses a plurality of external servers is performed, preparation of a mechanism for managing processing executed in a distributed manner is needed. In a case where a server for managing the distributed processing is not used, for example, identification information of a job is added to data, which is transmitted and received between the servers and between the server and a terminal apparatus, and the processing is managed in the terminal apparatus based on the identification information.

JP2013-77129A discloses a system including a plurality of client PCs and a printing apparatus. In the same system, one client PC divides print data into a plurality of divided data, generates distributed consignment data by adding divided information and identification information of a job to the divided data, and then distributes the divided data to the other plurality of client PCs. The other client PC rasterizes the divided data included in the received distributed consignment data, generates a divided print job including the rasterized divided data, the divided information, and the job information, and then transmits the divided print job to the printing apparatus. The printing apparatus registers a divided print job record in a spool in association with the received divided print job and prints the divided print job of the divided print jobs registered in the spool, in which all the divided print jobs corresponding to the print data are collected, in the order in the print data indicated in the divided information.

SUMMARY

In a system in which distributed processing is executed by a plurality of servers, in a case where a failure has occurred in one of the servers and a processing result by that server cannot be obtained, the entire processing cannot be completed.

Aspects of non-limiting embodiments of the present disclosure relate to an information processing apparatus, a distributed processing system, a non-transitory computer readable medium storing a program, and an information processing method that are capable of acquiring the processing results of processing distributed to the servers, in a system in which distributed processing is executed by a plurality of servers, in a case where a failure has occurred in one of the servers.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus includes a processor configured to provide an execution instruction for processing to a server that executes distributed processing, acquire a processing result of the processing, which is distributed to the server in the distributed processing, from each of servers, in a case where a predetermined condition is satisfied without acquiring the processing result for respective processing related to the distributed processing, provide a notification indicating that the processing result has not been acquired to each server that executes the distributed processing, and after the notification, among the servers that execute the distributed processing, acquire the processing result from a different server that is different from the server to which the processing, which is related to the processing result that has not been acquired in a case where the condition is satisfied, is distributed.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Configuration of System

Figure 1:
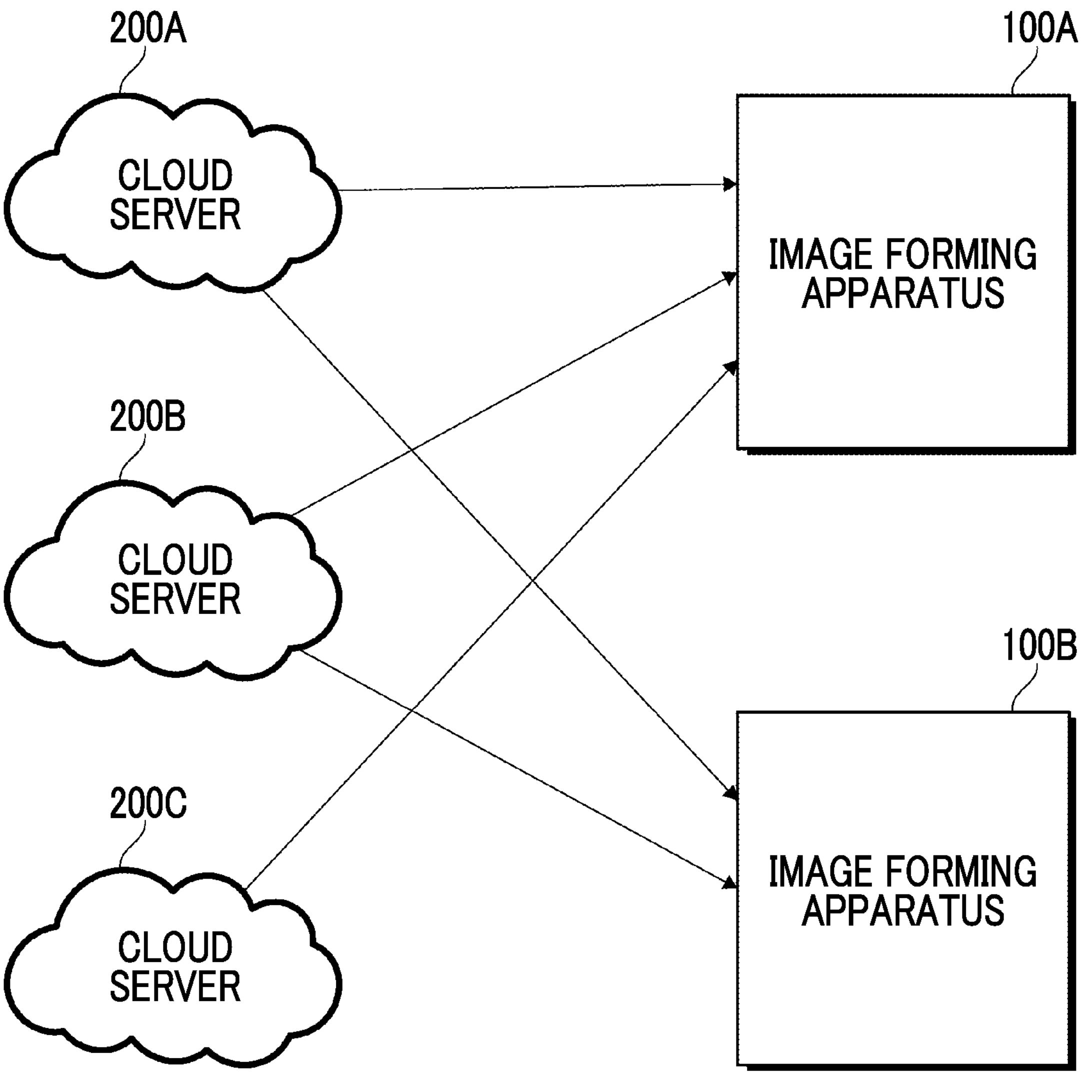
FIG. 1 is a diagram showing an example of a configuration of a system to which the present exemplary embodiment is applied.

FIG. 1 is a diagram showing an example of a configuration of a system to which the present exemplary embodiment is applied. The system of the present exemplary embodiment includes an image forming apparatus 100 and a cloud server 200. FIG. 1 shows two image forming apparatuses 100 and three cloud servers 200, but each of the number of image forming apparatuses 100 and the number of cloud servers 200 is not limited to the number shown in the figure. In a case where distinguishing each image forming apparatus 100, as shown in FIG. 1, the image forming apparatuses 100A, 100B, and the like are represented with subscripts. Similarly, in a case where distinguishing each cloud server 200, as shown in FIG. 1, the cloud servers 200A, 200B, 200C, and the like are represented with subscripts.

The image forming apparatus 100 acquires image data to be processed from the cloud server 200, performs image forming processing on a medium such as paper, and outputs the image data. The image forming apparatus 100 is an example of an information processing apparatus. The cloud server 200 is a server built in a so-called cloud environment on the Internet and performs image processing on image data output by the image forming apparatus 100. The cloud server 200 performs processing such as an image rasterization, an image compression, and a binarization, for example.

In the present exemplary embodiment, as shown in FIG. 1, the image processing is performed by distributed processing of a plurality of cloud servers 200 (cloud servers 200A, 200B, and 200C in the illustrated example). The image forming apparatus 100 acquires result data of the image processing distributed to the plurality of cloud servers 200 from each cloud server 200 and integrates and prints out the result data. Further, as shown in FIG. 1, each cloud server 200 may perform the image processing of the image data output by the plurality of image forming apparatuses 100 (the image forming apparatuses 100A and 100B in the illustrated example) in parallel.

Configuration of Image Forming Apparatus 100

Figure 2:
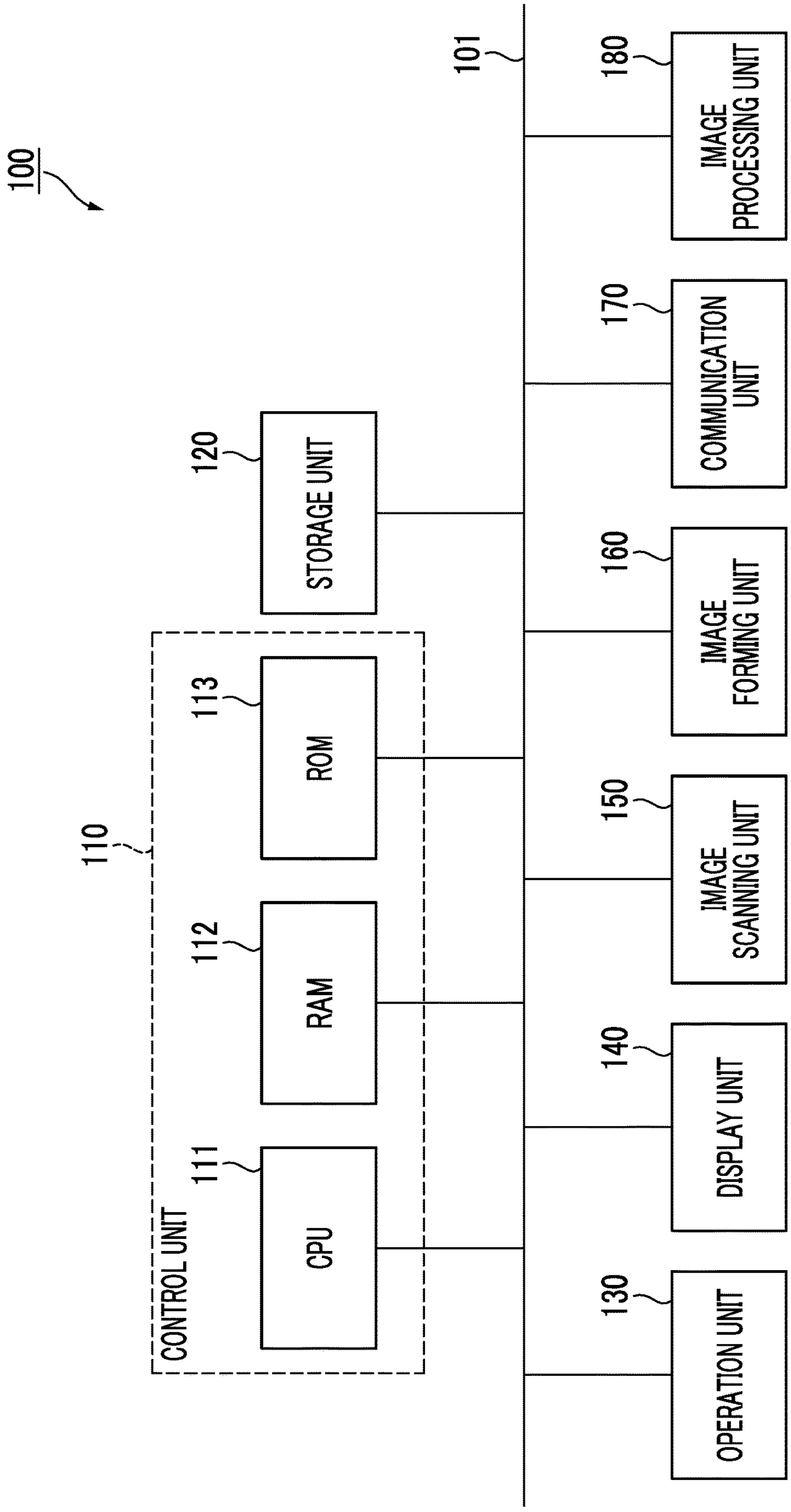
FIG. 2 is a diagram showing a configuration of an image forming apparatus to which the present exemplary embodiment is applied.

FIG. 2 is a diagram showing a configuration of the image forming apparatus 100 to which the present exemplary embodiment is applied. The image forming apparatus 100 includes a control unit 110, a storage unit 120, an operation unit 130, a display unit 140, an image scanning unit 150, an image forming unit 160, a communication unit 170, and an image processing unit 180. Each of these functional units is connected to a bus 101 and performs reception of data via the bus 101.

The control unit 110 controls each of the above-mentioned functional units in the image forming apparatus 100. Further, the control unit 110 is a functional unit that executes various data processing. The control unit 110 includes a central processing unit (CPU) 111 that is a calculator, and a random access memory (RAM) 112 and a read only memory (ROM) 113 that are memories. The RAM 112 is a main storage device (main memory) and is used as a working memory in a case where the CPU 111 performs calculation processing. Data such as a program or a set value prepared in advance is stored in the ROM 113, and the CPU 111 directly reads the program or the data from the ROM 113 and executes processing. Further, the program or data is also stored in the storage unit 120. The CPU 111 reads the program stored in the storage unit 120 into the RAM 112 and executes the program.

In the present exemplary embodiment, the CPU 111 of the control unit 110 reads and executes the program to implement various functions described later. The functions implemented in the present exemplary embodiment include transmission of an apparatus ID, reception and confirmation of various IDs including the apparatus ID, reception of the data to be processed, and the like.

The storage unit 120 is a functional unit that stores the program or data for the CPU 111 to execute as described above and also stores various data, which is generated by various operations, such as image data scanned by an image scanning unit 150. The storage unit 120 is implemented by, for example, a storage device such as a magnetic disk device or a solid state drive (SSD).

The operation unit 130 is a functional unit that receives a user operation. The operation unit 130 is configured with, for example, a hardware key, a touch sensor that outputs a control signal according to a position pressed or touched by a finger, or the like. The operation unit 130 may be configured as a touch panel in which a touch sensor and a liquid crystal display constituting the display unit 140 are combined.

The display unit 140 is a functional unit that displays an information image that presents various information to a user, a preview image of an image to be processed such as scanning or outputting, an operation image for the user to perform an operation, and the like. The display unit 140 is configured with, for example, a liquid crystal display. The operation unit 130 and the display unit 140 can be combined and used as a user interface for the user to input and output information to and from the image forming apparatus 100.

The image scanning unit 150 is a functional unit that optically scans an image on a document. Examples of an image scanning method include a charge coupled device (CCD) method in which the reflected light to light emitted from a light source to a document is reduced by the lens and received by the CCDs, a contact image sensor (CIS) method in which the reflected light to light emitted from a light emitting diode (LED) light source to the document in order is received by the CIS, and the like.

The image forming unit 160 is a functional unit that forms an image based on image data on a recording material such as paper by using an image forming material. An example of a method of forming an image on the recording material includes an electrophotographic method of using toner as an image forming material and transferring the toner adhering to the photoconductor to a recording material to form an image.

The communication unit 170 is a functional unit that transmits and receives a command or data to and from between the communication unit 170 and the external apparatus. An example of the communication unit 170 includes an interface that corresponds to a communication method with the external apparatus. The connection with the external apparatus may be made via a network or may be made via a direct connection. A communication line may be a wired line or a wireless line.

The image processing unit 180 is a functional unit that includes a processor that is a calculator and a working memory, and performs the image processing such as color correction or gradation correction on the image represented by the image data. The CPU 111 of the control unit 110 may be used as the processor, and the RAM 112 of the control unit 110 may be used as the working memory, in combination, respectively. In the present exemplary embodiment, at least a part of the image processing performed on the image data is performed by the cloud server 200. The image processing unit 180 is an image processing that is not performed in the cloud server 200 and executes processing in which whether or not to be applied is determined in a case where output is performed by the image forming apparatus 100, or processing in which change in settings is performed.

Procedure for Transmitting Image Data

Figure 3:
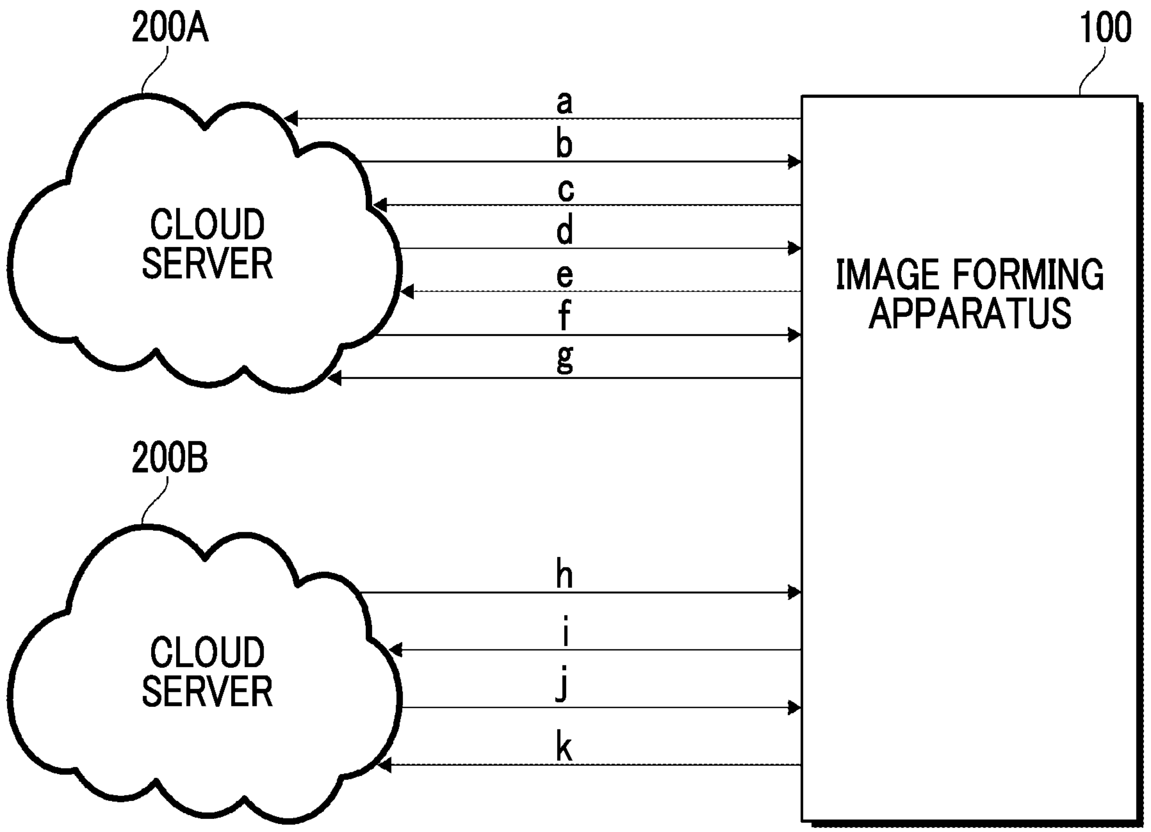
FIG. 3 is a diagram showing a procedure for transmitting image data from a cloud server to the image forming apparatus.

FIG. 3 is a diagram showing a procedure for transmitting image data from the cloud server 200 to the image forming apparatus 100. FIG. 3 shows an example in which one image forming apparatus 100 acquires image data from two cloud servers 200A and 200B. Here, the distributed processing is performed by distributing the data to be processed to each of the cloud servers 200A and 200B for each predetermined data block. The data block can be set according to the type of data to be processed, the processing capacity of the cloud servers 200A and 200B and image forming apparatus 100, the communication speed, or the like, but in the present exemplary embodiment, for example, a unit of a data block may be defined as one page of image data. In the illustrated example, the assumption is made that three pages of image data are transmitted and received, the image processing of the first page and the third page is performed by the cloud server 200A, and the image processing of the second page is performed by the cloud server 200B.

As a preliminary operation, the image data to be processed in an output processing unit of the image forming apparatus 100 (hereinafter, referred to as a "job") and setting information in the image processing are given to each of the cloud servers 200A and 200B in advance. On the other hand, the assumption is made that all the image data in the jobs are given to each of the cloud servers 200A and 200B regardless of the distribution of the image data to be processed in the distributed processing. Each of the cloud servers 200A and 200B performs the image processing on the image data assigned to the cloud server among all the image data related to the acquired jobs and transmits the image data of the processing result to the image forming apparatus 100. The provision of the image data and the setting information with respect to each of the cloud servers 200A and 200B, and the distribution of the image data in the distributed processing are performed, for example, by a management server (not shown) provided separately from the cloud server 200.

In the example shown in FIG. 3, in a case where the image forming apparatus 100 executes the job, the image forming apparatus 100 acquires image data for each page from the cloud servers 200A and 200B as a result of the image processing. The image data is acquired by the following procedure. In the following description, the reference numerals (a) to (k) correspond to the reference numerals (a) to (k) attached to the arrows indicating the data exchange performed between the cloud servers 200A and 200B and the image forming apparatus 100 in FIG. 3.

First, the image forming apparatus 100 transmits an execution instruction for the job and an apparatus ID to the cloud server 200A (a). Here, the execution instruction for the job is a command for causing the cloud server 200 to execute the image processing and the transmission of the processed image data in order for the image forming apparatus 100 to start the printing processing. The apparatus ID is identification information for identifying the image forming apparatus 100.

In a case where the cloud server 200A receives the execution instruction for the job and the apparatus ID from the image forming apparatus 100, the cloud server 200A sets a job ID for the job related to the execution instruction and executes the image processing on the image data that is a target of the job. Thereafter, the cloud server 200A transmits the set job ID and the apparatus ID acquired from the image forming apparatus 100 to the image forming apparatus 100 specified by the apparatus ID (b). The job ID is identification information for identifying the job related to the execution instruction. Further, the cloud server 200A transfers the received execution instruction for the job, the apparatus ID, and the set job ID to the cloud server 200B that shares the distributed processing.

The image forming apparatus 100 acquires the job ID and the apparatus ID from the cloud server 200A and checks whether or not the acquired apparatus ID is the apparatus ID of the image forming apparatus 100. In a case where the acquired apparatus ID matches the apparatus ID of the image forming apparatus 100, the image forming apparatus 100 notifies the cloud server 200A of a notification (hereinafter, referred to as a "confirmation notification") indicating that the apparatus ID is correct (c). Further, the image forming apparatus 100 stores the acquired job ID and uses the job ID for determining whether the image data subsequently received from the cloud server 200A is the data of the job related to the execution instruction.

In a case where the confirmation notification is received from the image forming apparatus 100, the cloud server 200A starts transmitting the image data. The transmission of the image data is performed for each page. Since the first page and the third page are assigned to the cloud server 200A, the cloud server 200A first transmits the image data of the first page, the job ID, the apparatus ID, and the page ID to the image forming apparatus 100 (d).

The image forming apparatus 100 checks each ID received from the cloud server 200A. Specifically, for example, whether or not the job ID is the job ID received from the cloud server 200A in the above (b), whether or not the apparatus ID is the apparatus ID of the image forming apparatus 100, whether the page ID of the already received page is duplicated, and the like are checked. In a case where there is no problem with each ID, the image forming apparatus 100 stores the received image data of the first page and notifies the cloud server 200A of a notification (hereinafter, referred to as an "acquisition notification") that the image data is received (e).

Next, the cloud server 200A transmits the image data of the third page, the job ID, the apparatus ID, and the page ID to the image forming apparatus 100 (f). The image forming apparatus 100 checks each ID received from the cloud server 200A. Thereafter, in a case where there is no problem with each ID, the image forming apparatus 100 stores the received image data of the third page and notifies the cloud server 200A of the acquisition notification (g). Hereinafter, in a case where there is untransmitted image data, the cloud server 200A and the image forming apparatus 100 repeat the above processing.

In the example shown in FIG. 3, since the transmission of all the image data distributed above is completed, the cloud server 200A performs end processing and ends the processing related to the job. Examples of the end processing include transmitting a notification indicating the transmission end of the image data of the corresponding job in the cloud server 200A to the image forming apparatus 100.

Next, an operation of the cloud server 200B will be described. In a case where the execution instruction for the job, the apparatus ID, and the job ID are received from the cloud server 200A, the cloud server 200B executes the image processing on the image data that is a target of the job. Thereafter, the cloud server 200B transmits the apparatus ID and the job ID received from the cloud server 200A to the image forming apparatus 100 specified by the apparatus ID (h). The image forming apparatus 100 acquires the job ID and the apparatus ID from the cloud server 200B and checks whether or not the acquired apparatus ID is the apparatus ID of the image forming apparatus 100. In a case where the acquired apparatus ID matches the apparatus ID of the image forming apparatus 100, the image forming apparatus 100 notifies the cloud server 200B of the confirmation notification indicating that the apparatus ID is correct (i).

In a case where the confirmation notification is received from the image forming apparatus 100, the cloud server 200B starts transmitting the image data. The transmission of the image data is performed for each page, and the second page is assigned to the cloud server 200B. Therefore, the cloud server 200B transmits the image data of the second page, the job ID, the apparatus ID, and the page ID to the image forming apparatus 100 (j).

The image forming apparatus 100 checks each ID received from the cloud server 200B. Thereafter, in a case where there is no problem with each ID, the image forming apparatus 100 stores the received image data of the second page and notifies the cloud server 200B of the acquisition notification (k). Hereinafter, in a case where there is untransmitted image data, the cloud server 200B and the image forming apparatus 100 repeat the above processing. In the example shown in FIG. 3, since a page assigned to the cloud server 200B is only the second page, the cloud server 200B performs the end processing and ends the processing related to the job.

In the above operation example, the cloud server 200A sets the job ID in response to the execution instruction for the job from the image forming apparatus 100. In contrast to this, the job ID may be set in advance and shared between each of the cloud servers 200A and 200B that performs the distributed processing. Further, the image forming apparatus 100 may set the job ID and transmit the job ID to each of the cloud servers 200A and 200B that performs the distributed processing. Further, in the above operation example, the cloud server 200A transfers the execution instruction and the apparatus ID acquired from the image forming apparatus 100 to another cloud server 200B that performs the distributed processing. In contrast to this, image forming apparatus 100 may transmit the execution instruction and the apparatus ID to each of the cloud servers 200A and 200B that performs the distributed processing.

In the above operation example, the cloud servers 200A and 200B transmit the apparatus ID when communication is started and receive the confirmation notification by the image forming apparatus 100. As a result, the confirmation is made that the transmission destination of the image data in the job is correct between the cloud servers 200A and 200B, and the image forming apparatus 100. Further, in a case where the cloud servers 200A and 200B transmit the image data for each page to the image forming apparatus 100, the apparatus ID is transmitted and the confirmation notification by the image forming apparatus 100 is received again. As a result, the confirmation is made that the transmission destination is correct for each page between the cloud servers 200A and 200B, and the image forming apparatus 100.

In the above operation example, the operation, in which one image forming apparatus 100 acquires the image data, has been described, but in a case where one cloud server 200 transmits the image data to a plurality of image forming apparatuses 100A and 100B, transmissions for each page to the image forming apparatus 100A and the image forming apparatus 100B can be alternately performed. In such a case, by checking the transmission destination for each page, the occurrence of erroneous transmission on a page unit can be prevented. In the above operation example, the apparatus ID is transmitted together with the image data for each page, but the procedure is merely an example. In a case where the cloud server 200 transmits the image data, the cloud server 200 may first transmit the apparatus ID, acquire the confirmation notification from the image forming apparatus 100, and transmit the image data.

Response Operation When Failure Occurs

Figure 4:
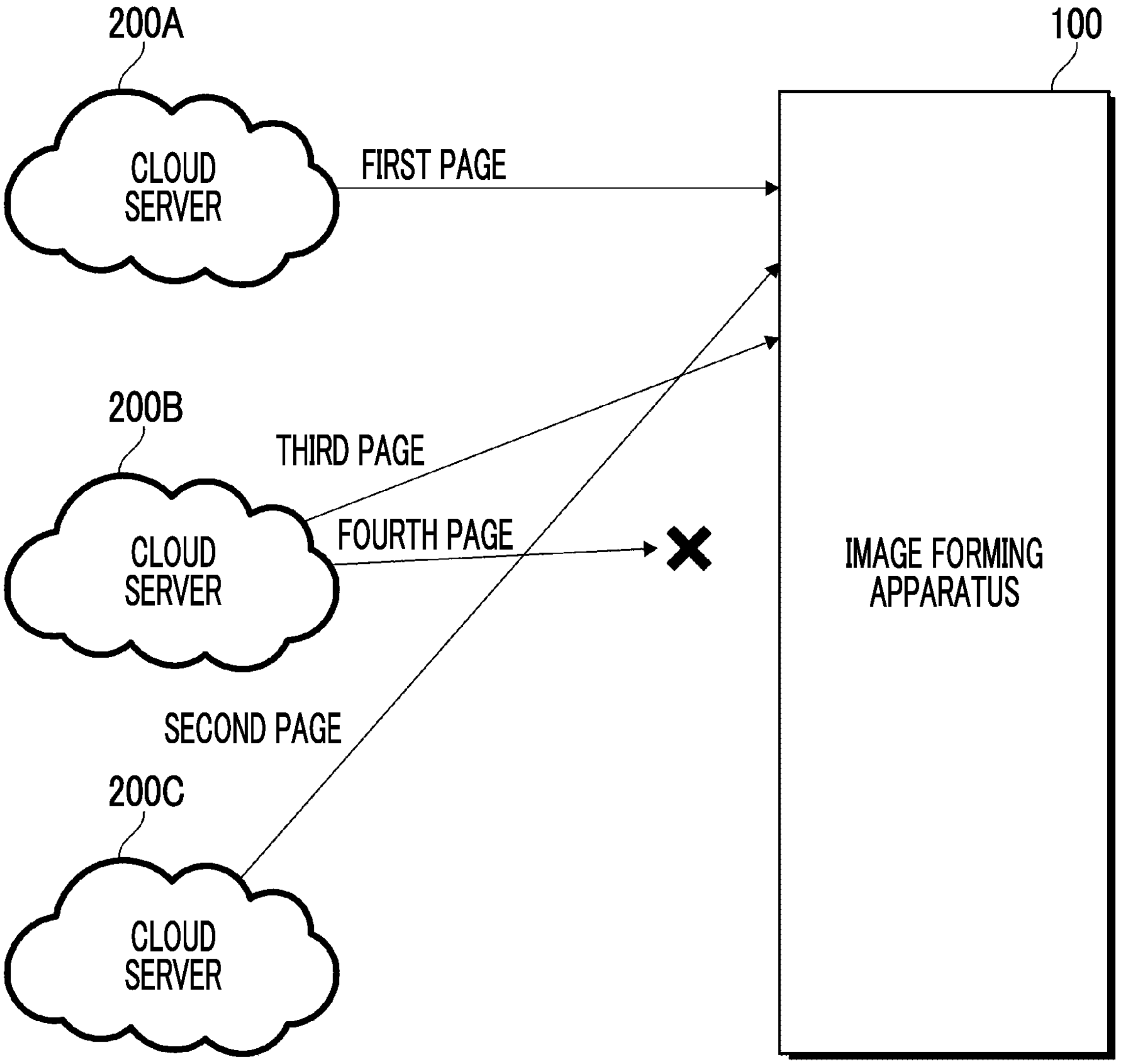
FIG. 4 is a diagram showing a state in which a failure has occurred in one cloud server during transmission of the image data, and the transmission of the image data is interrupted.

FIG. 4 is a diagram showing a state in which a failure has occurred in one cloud server 200 during transmission of the image data, and the transmission of the image data is interrupted. In a case where a failure has occurred in the cloud server 200, the image forming apparatus 100 cannot obtain the data, which is assigned to the cloud server 200, from the cloud server 200 where the failure has occurred. In the present exemplary embodiment, in a case where a failure has occurred in one cloud server 200, necessary data is acquired from another cloud server 200.

In the example shown in FIG. 4, the image data is transmitted from the three cloud servers 200A, 200B, and 200C to the image forming apparatus 100. The assumption is made that the first page is assigned to the cloud server 200A, the third page and the fourth page are assigned to the cloud server 200B, and the second page is assigned to the cloud server 200C.

The assumption is made that a failure occurred in the cloud server 200B while the operation of transmitting the image data from the cloud servers 200A, 200B, and 200C to the image forming apparatus 100 is being executed. The assumption is made that the failure occurred after the cloud server 200B transmitted the image data of the third page and before the cloud server 200B transmitted the image data of the fourth page. The image data is transmitted normally by the cloud servers 200A and 200C. In this case, the image forming apparatus 100 acquires the image data from the first page to the third page but cannot acquire the image data of the fourth page. In the present exemplary embodiment, the cloud servers 200A and 200C where the failure has not occurred transmit the image data of the fourth page to the image forming apparatus 100 as follows.

Figure 5:
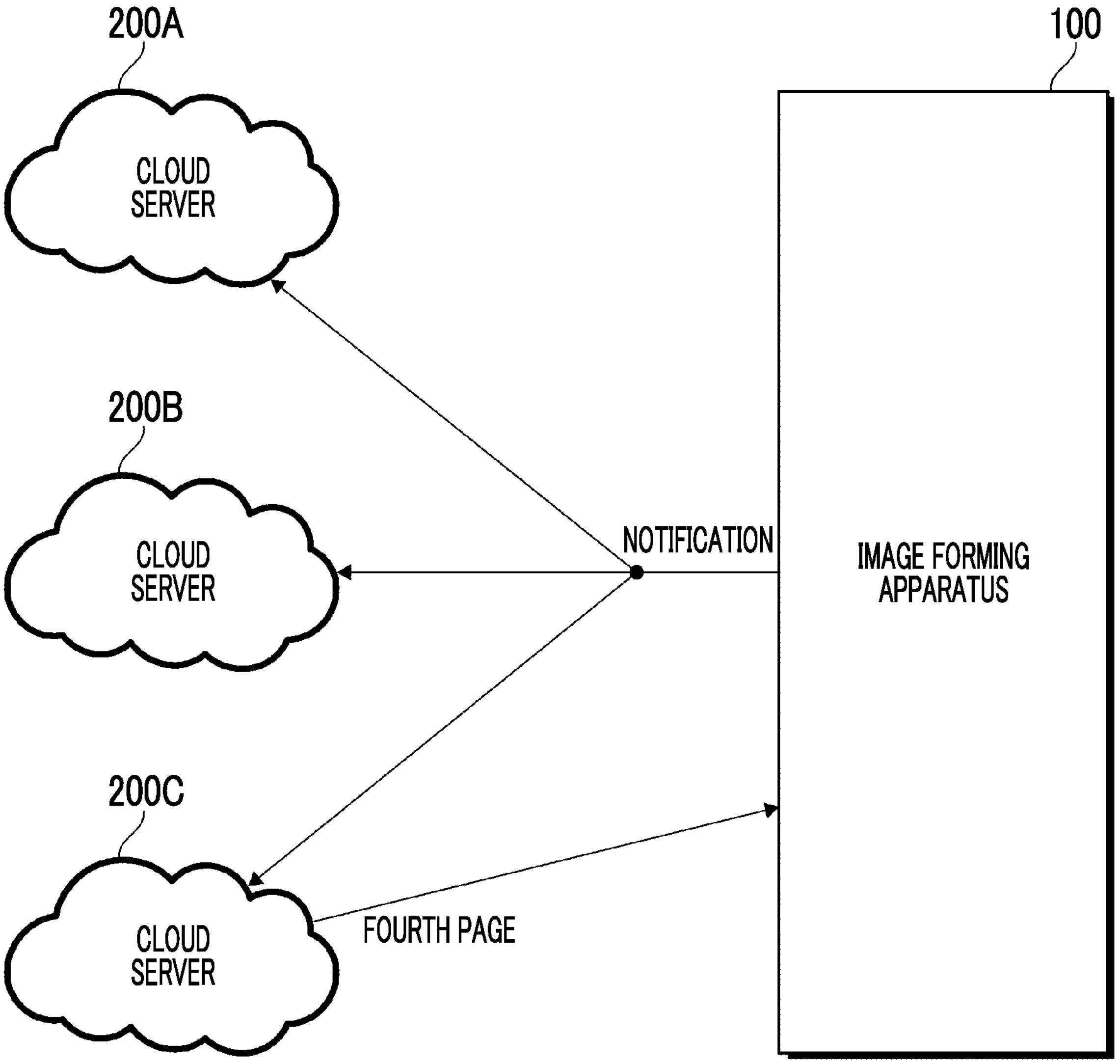
FIG. 5 is a diagram showing an operation of the image forming apparatus and the cloud server after a failure occurred in the cloud server.

FIG. 5 is a diagram showing an operation of the image forming apparatus 100 and the cloud server 200 after the failure occurred in the cloud server 200. In a case where the image forming apparatus 100 satisfies a predetermined condition in a state in which the image data of the fourth page cannot be obtained, the image forming apparatus 100 notifies each cloud server 200 of a notification (hereinafter, referred to as an "unreceived notification") indicating that the image data of the fourth page is not acquired. The predetermined condition can be set variously, and for example, may be set such that a preset time has elapsed. The unreceived notification is performed with respect to all the cloud servers 200 (200A, 200B, 200C) that are the execution targets of the distributed processing. This is because the image forming apparatus 100 does not know which cloud server 200 the failure has occurred in.

In a case where the notification is received, the cloud servers 200A and 200C where the failure has not occurred receive an additional assignment of the fourth page that has not been transmitted. As a result, the page that is assigned to the cloud server 200B where the failure has occurred is assigned to another cloud server 200 (the cloud server 200A or the cloud server 200C) where the failure has not occurred. The additional assignment is made, for example, by the management server 300. The management server 300 is a server that manages the execution of the job and is a server that provides the image data to be processed or the setting information in the job with respect to each cloud server 200, distributes the image data in distributed processing, and the like. Here, the assumption is made that the fourth page is assigned to the cloud server 200C.

The cloud server 200C to which the fourth page is assigned executes the image processing on the fourth page. Thereafter, the cloud server 200C transmits the image data of the fourth page according to the procedure described with reference to FIG. 3. That is, after checking the job ID and the apparatus ID when the transmission is started, the image data of the fourth page, the job ID, the apparatus ID, and the page ID are transmitted to the image forming apparatus 100.

After transmitting the unreceived notification to each cloud server 200 that executes the distributed processing, the image forming apparatus 100 checks whether or not the apparatus ID, which is received from the cloud server 200C together with the job ID when the communication is started, is the apparatus ID of the image forming apparatus 100 and returns the confirmation notification in a case where the apparatus ID is the apparatus ID of the image forming apparatus 100. Further, the image forming apparatus 100 checks each ID received from the cloud server 200C together with the image data when the image data of the fourth page is received. Thereafter, in a case where there is no problem with each ID, the image forming apparatus 100 stores the received image data of the fourth page and notifies the cloud server 200C of the acquisition notification.

In a case where data transmission processing by the same job as the additionally assigned data is being executed in the cloud server 200C, the cloud server 200C may omit the checking when the transmission is started. For example, the assumption is made that the total number of pages of the image data related to the job is 10 pages, and the third, sixth, and ninth pages are distributed to the cloud server 200C. The assumption is made that in the cloud server 200, transmission is completed up to the sixth page, and the eighth page is additionally assigned when the ninth page is not transmitted. In this case, since the transmission processing by the job is being executed in the cloud server 200C (the ninth page has not been transmitted), the cloud server 200C may transmit the eighth page as a part of the transmission processing.

In the above operation example, the management server 300 performs the additional assignment of the processing with respect to the image data that is not able to be transmitted to the image forming apparatus 100 in the cloud server 200B where the failure has occurred, but the operation example is just an exemplification. For example, a cloud server 200 may be determined for performing the additional image processing and transmission by exchanging information between the cloud servers 200 where the failure has not occurred. In this case, in the exchange of the information between the cloud servers 200, for example, the additional assignment may be made with respect to the cloud server 200, which currently has the lightest load, by comparing the load state of each cloud server 200.

Operation of Cloud Server 200

Figure 6:
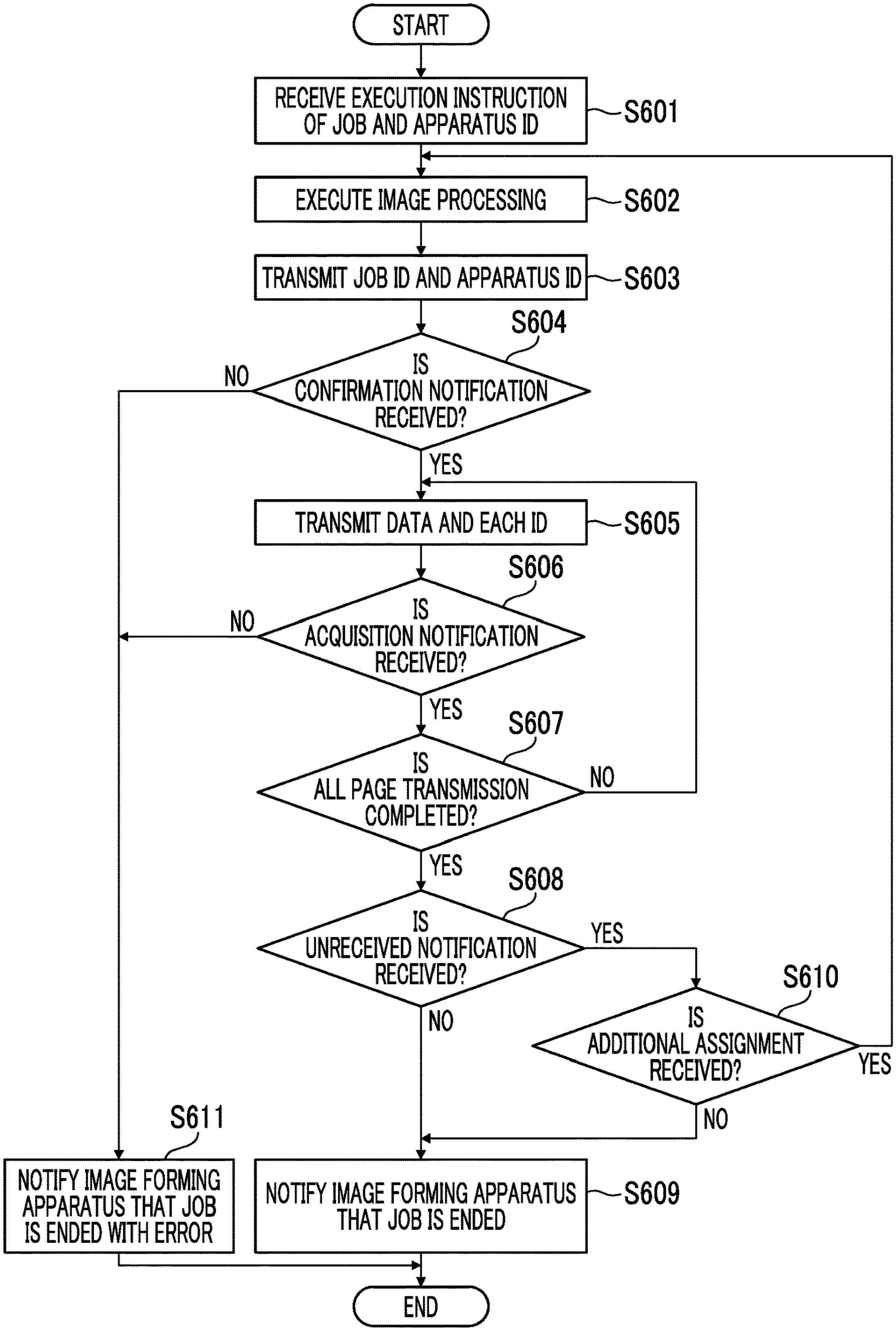
FIG. 6 is a flowchart showing an operation of the cloud server.

FIG. 6 is a flowchart showing an operation of the cloud server 200. In a case where the cloud server 200 receives the execution instruction for the job and the apparatus ID from the image forming apparatus 100 (S601), the cloud server 200 sets the job ID and executes the image processing in response to the received execution instruction (S602). Thereafter, the cloud server 200 transmits the job ID and the apparatus ID to the image forming apparatus 100 (S603).

Next, in a case where the cloud server 200 receives the confirmation notification from the image forming apparatus 100 within specified time (YES in S604), the cloud server 200 transmits the image data processed in 5602 to the image forming apparatus 100 for each predetermined data block (for example, for each page). Further, the cloud server 200 transmits each ID (the job ID, page ID, and apparatus ID) together with the image data to the image forming apparatus 100 (S605). In a case where the confirmation notification is not received within the specified time (NO in S604), the cloud server 200 transmits a notification indicating that the job is ended due to an error to the image forming apparatus 100 (S611).

In a case where the cloud server 200 receives the acquisition notification of the image data of the transmitted page from the image forming apparatus 100 within the specified time (YES in S606), the cloud server 200 determines whether or not the transmission of all the image data (all the pages) related to the job is completed. In a case where the transmission is not completed (NO in S607), the process returns to 5605, and the cloud server 200 transmits the untransmitted image data and each ID to the image forming apparatus 100. On the other hand, in a case where the transmission of all the image data related to the job is completed (YES in S607), the cloud server 200 determines whether or not the unreceived notification is received from the image forming apparatus 100. Further, in a case where the acquisition notification is not received within the specified time (NO in S606), the cloud server 200 transmits a notification indicating that the job is ended due to an error to the image forming apparatus 100 (S611).

In a case where the unreceived notification is not received (NO in S608), the cloud server 200 transmits a notification indicating that the processing of the cloud server in the job is ended to the image forming apparatus 100 (S609). In a case where a failure has occurred in another cloud server 200 related to the distributed processing and the unreceived notification is received from the image forming apparatus 100 (YES in S608), thereafter, the cloud server 200 determines whether or not the additional assignment of the image data to be processed in the job is received.

In a case where the additional assignment is not received (NO in S610), the cloud server 200 transmits a notification indicating that the processing of the cloud server in the job is ended to the image forming apparatus 100 (S609). On the other hand, in a case where the additional assignment of the image data is received (YES in S610), the process returns to S602, and the cloud server 200 performs the image processing on the additionally assigned image data. Thereafter, the cloud server 200 executes the processing after the transmission of the job ID and the apparatus ID to the image forming apparatus 100 (S603) regarding the image data in which the image processing is newly performed.

In the above operation example, the cloud server 200 determines whether or not the unreceived notification is received from the image forming apparatus 100 after the transmission of all the image data related to the job is completed. On the other hand, even before the transmission of all the image data related to the job is completed, in a case where the unreceived notification is received and the additional assignment of the image data is received, the processing of the image data by the additional assignment may be performed in the same manner as the image data assigned to the cloud server in the initial distribution.

Operation of Image Forming Apparatus 100

Figure 7:
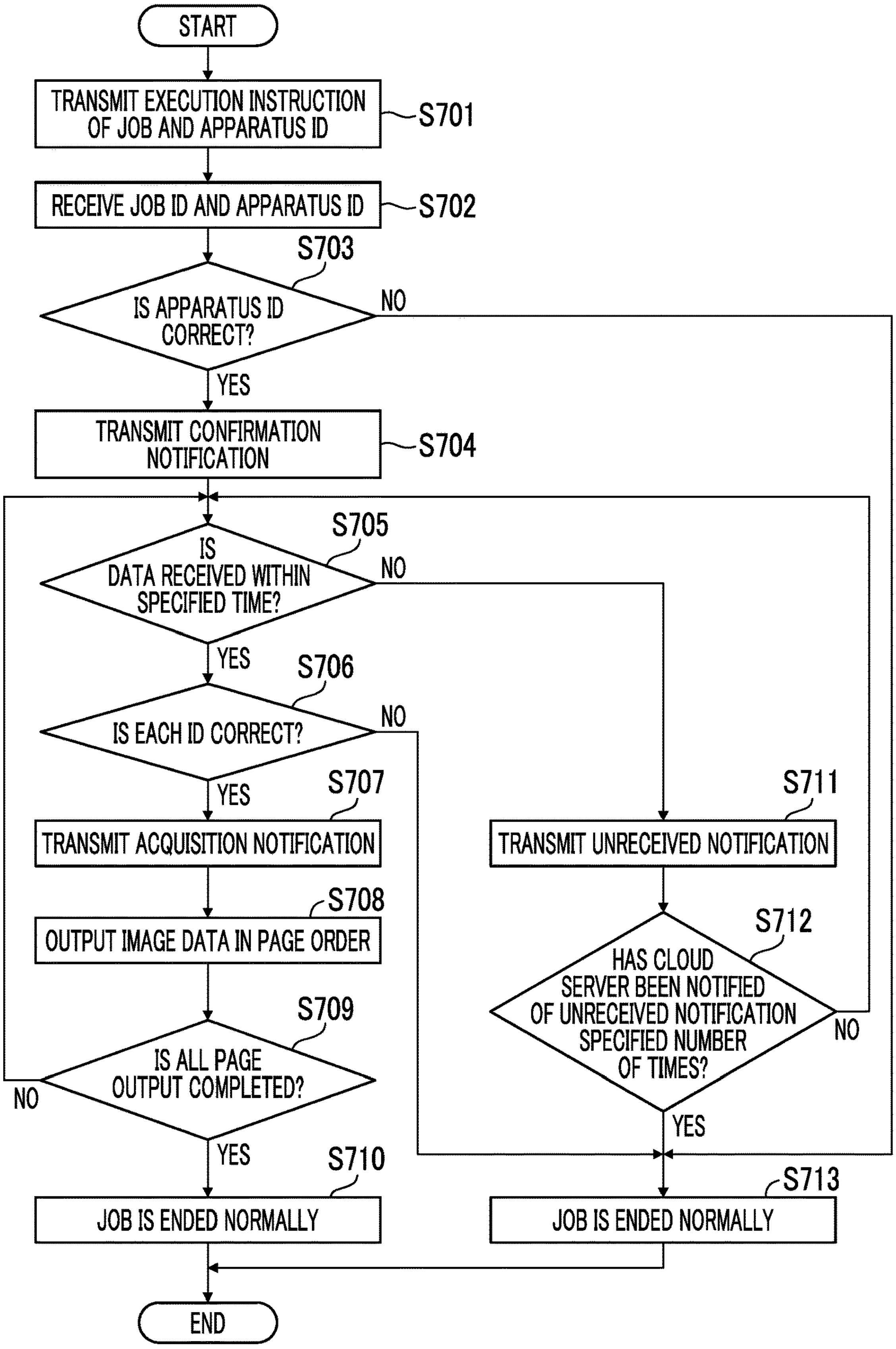
FIG. 7 is a flowchart showing an operation of the image forming apparatus.

FIG. 7 is a flowchart showing an operation of the image forming apparatus 100. In a case where the job is started, first, the image forming apparatus 100 transmits the execution instruction for the job and the apparatus ID to the cloud server 200 that executes the image processing by the distributed processing (S701), and waits for a response from the cloud server 200. Thereafter, in a case where the image forming apparatus 100 receives the job ID and the apparatus ID from the cloud server 200 (S702), the image forming apparatus 100 determines whether or not the received apparatus ID is correct (whether or not the apparatus ID matches the apparatus ID of the image forming apparatus 100).

In a case where the received apparatus ID is correct (YES in S703), the image forming apparatus 100 transmits the confirmation notification to the cloud server 200 (S704). In a case where the received apparatus ID is not correct (NO in S703), the image forming apparatus 100 ends the job with an error (S713). In a case where the job is ended with an error, for example, a message which indicates that the job is ended with an error, or the like is displayed on the UI screen that is displayed on the display unit 140 (see FIG. 2) of the image forming apparatus 100. The displayed message may include, for example, information such as the end of the job due to an error, the type of an error, and the countermeasures.

After transmitting the confirmation notification, the image forming apparatus 100 determines whether or not the image data is received within the specified time. In a case where the image data is received within the specified time (YES in S705), the image forming apparatus 100 determines whether or not there is a problem in each ID received together with the image data. In a case where received each ID is correct (YES in S706), the image forming apparatus 100 stores the received image data and returns the acquisition notification to the cloud server 200 (S707). On the other hand, in a case where any of the received IDs is not correct (NO in S706), the image forming apparatus 100 ends the job with an error (S713).

After transmitting the acquisition notification to the cloud server 200, the image forming apparatus 100 outputs the stored image data in page order (S708). The image forming apparatus 100 repeats the operations of S705 to S708 until all the image data (all the pages) related to the job are output (NO in S709). In a case where the output of all the image data is completed (YES in S709), the image forming apparatus 100 ends the job normally (S710). In a case where the job is ended normally, for example, a message which indicates that the job is ended normally, or the like is displayed on the UI screen that is displayed on the display unit 140 of the image forming apparatus 100.

In a case where the image data is not received within the specified time after transmitting the confirmation notification (NO in S705), the image forming apparatus 100 transmits the unreceived notification to the cloud server 200 (S711) and waits for a response from the cloud server 200. The image forming apparatus 100 repeats the unreceived notification every specified time described in S705, for example, until the number of times of unreceived notification reaches the specified number of times (NO in S712). Thereafter, in a case where the image data and each ID are received before the number of times of unreceived notification reaches the specified number of times (YES in S705), the image forming apparatus 100 executes the processing after the checking of each ID (S706). On the other hand, in a case where the number of times of unreceived notification has reached the specified number of times (YES in S712), the image forming apparatus 100 ends the job with an error (S713).

In the above operation, the image forming apparatus 100 may acquire all the image data and then perform print out or may perform output processing in parallel while receiving the image data. Here, the reception of the image data from the plurality of cloud servers 200 is not always in page order. For example, in the example described with reference to FIGS. 4 and 5, the image data of the third page can be received from the cloud server 200B before the image data of the second page is received from the cloud server 200C. In such a case, in the latter example, for example, handling may be made by preparing a buffer memory with a sufficient data capacity (for example, capacity corresponding to the amount of data for several pages) in the image forming apparatus 100, buffering the image data received in the page order before and after, and outputting the image data in the page order.

Other Application Examples

In the above exemplary embodiment, in a case where the information processing apparatus is defined as the image forming apparatus 100 and the job, where the print out is performed by acquiring the image data in which the image processing is performed by the distributed processing of the plurality of cloud servers 200, is executed has been described as an example, but in addition to the above-described exemplary embodiment, the present exemplary embodiment can be applied to various systems that execute the job by acquiring the data in which the distributed processing of the plurality of cloud servers 200 is performed. For example, the present exemplary embodiment may be applied to a system where the information processing apparatus is defined as a motion picture playback apparatus and the job to acquire and playback motion picture data, which is edited by the distributed processing of the plurality of cloud servers 200, is executed.

In this case, the data block, which is a unit of processing in each cloud server 200 and transmission to the information processing apparatus (the motion picture playback apparatus), may be, for example, motion picture data with a frame unit. In this application example, each cloud server 200 that performs the distributed processing acquires the execution instruction for the job and the apparatus ID from the information processing apparatus and processes the motion picture data to be processed (in other words, generates the motion picture data that is already processed). Thereafter, the cloud server 200 transmits the job ID and the apparatus ID to the information processing apparatus and waits for the confirmation notification. In a case where the cloud server 200 receives the confirmation notification, the cloud server 200 transmits the motion picture data that is already processed in a frame unit, the job ID, the apparatus ID, and the frame ID as the identification information of the frame to the information processing apparatus.

In a case where the information processing apparatus executes the job, the information processing apparatus first transmits the execution instruction for the job and the apparatus ID to the cloud server 200. In a case where the information processing apparatus acquires the job ID and the apparatus ID from the cloud server 200, the information processing apparatus performs the confirmation notification by checking the apparatus ID and waits for the data to be transmitted. In a case where the information processing apparatus receives the motion picture data that is already processed in a frame unit, the job ID, the apparatus ID, and the frame ID from the cloud server 200, the information processing apparatus checks each ID, stores the motion picture data, and performs the acquisition notification. Thereafter, the information processing apparatus plays back the acquired motion picture data in time series order.

Further, in the above exemplary embodiment, the image forming apparatus 100, which is an example of the information processing apparatus, and the cloud server 200 are configured to directly exchange commands and data, but the configuration may be used such that such commands and data are exchanged via relay by the management server 300. For example, in the configuration example shown in FIG. 3, the image forming apparatus 100 is configured to transmit the execution instruction for the job and the apparatus ID with respect to one of the cloud servers 200 (the cloud server 200A in the example of FIG. 3) that executes the distributed processing. Further, a description is made that the image forming apparatus 100 may transmit the execution instruction and the apparatus ID not only to one cloud server 200 but also to each cloud server 200 that executes the distributed processing.

In contrast to this, the image forming apparatus 100 may transmit the execution instruction and the apparatus ID to the management server 300, and the management server 300 may transmit the execution instruction and the apparatus ID to the cloud server 200 that executes the distributed processing. Since the management server 300 distributes and manages data related to the distributed processing with respect to the cloud server 200 that executes the distributed processing, the management server 300 can specify the cloud server 200 that is the transmission destination of the execution instruction and the apparatus ID, for each job. As a result, the image forming apparatus 100 does not need to have information on the cloud server 200 that executes the distributed processing in advance. Similarly, the unreceived notification in a case where a failure has occurred in the cloud server 200 may be transmitted from the image forming apparatus 100 to the cloud server 200 where the failure has not occurred via the management server 300.

Although the exemplary embodiments of the present invention have been described above, the technical scope of the exemplary embodiment of the present invention is not limited to the above exemplary embodiment. For example, in the above exemplary embodiment, a description is made that the image forming apparatus 100, which is an example of the information processing apparatus, can have a configuration in which buffering is performed to output the image data acquired from the plurality of cloud servers 200 in page order. In contrast to this, the management server 300 may perform the buffering for the image data or the motion picture data which is the target data, and the information processing apparatus may acquire the image data or the motion picture data arranged in page order or time series order from the management server 300. Further, in the above exemplary embodiment, the configuration in which the cloud server 200 is used as the server for performing the image processing has been described as an example, but the server is not limited to the cloud server 200. For example, a configuration may be used such that a server machine that is connected to the outside of the image forming apparatus 100 via a network such as a local area network (LAN) or the Internet, a server that is virtually constructed on the network, or the like is used. Various changes and alternative configurations that do not deviate from the scope of the technical idea of the exemplary embodiment of the present invention are included in the exemplary embodiment of the present invention.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device). In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:

a processor configured to:

provide an execution instruction for processing to a plurality of servers that execute distributed processing;

acquire a processing result of the processing, which is distributed to the plurality of servers in the distributed processing, from each of the plurality of servers;

in response to determining that a predetermined condition is satisfied without acquiring the processing result for respective processing related to the distributed processing, repeat to provide a notification indicating that the processing result has not been acquired to each of the plurality of servers that executes the distributed processing;

determine whether a number of times of the notification has reached a predetermined number of times; and in response to determining that the number of times of the notification has not reached the predetermined number of times, among the servers that execute the distributed processing, acquire the processing result from a different server that is different from the server to which the processing, which is related to the processing result that has not been acquired in response to determining that the condition is satisfied, is distributed.

2. The information processing apparatus according to claim 1, wherein the processor is configured to:

acquire apparatus identification information indicating a transmission destination of the processing result from each of the servers; and in response to determining that the acquired apparatus identification information is apparatus identification information of the information processing apparatus, acquire the processing result from the server that is a transmission source of the apparatus identification information.

3. The information processing apparatus according to claim 2, wherein the processor is configured to:

in response to determining that communication for acquiring the processing result is started between the information processing apparatus and the server, acquire the apparatus identification information from each of the servers and determine whether the apparatus identification information is the apparatus identification information of the information processing apparatus; and in response to determining that the processing result is acquired from each of the servers, acquire the apparatus identification information and determine whether the apparatus identification information is the apparatus identification information of the information processing apparatus again.

4. The information processing apparatus according to claim 3, wherein the processor is configured to:

after the notification, in response to determining that the processing result is acquired from the different server, acquire the apparatus identification information and determine whether the apparatus identification information is the apparatus identification information of the information processing apparatus.

5. The information processing apparatus according to claim 2, wherein the processor is configured to:

provide the execution instruction for the processing and the apparatus identification information of the information processing apparatus to the server that executes the distributed processing.

6. The information processing apparatus according to claim 1, wherein the processor is configured to:

acquire all processing results in the distributed processing and execute processing based on the processing results.

7. The information processing apparatus according to claim 6, wherein the processor is configured to:

regarding one or a plurality of the processing results among the processing results in the distributed processing, in response to determining that the processing result is not acquired even after providing the notification a predetermined number of times, execute predetermined error processing without executing the processing based on the processing results of the distributed processing.

8. A distributed processing system comprising a plurality of servers that executes distributed processing in response to an instruction from a terminal apparatus and provides processing results to the terminal apparatus, wherein each server in the plurality of servers acquires an execution instruction for processing and apparatus identification information for identifying the terminal apparatus from the terminal apparatus, executes processing distributed to the server in the distributed processing in response to the execution instruction, transmits identification information of the executed processing and the apparatus identification information for identifying the terminal apparatus to the terminal apparatus and transmits the processing result to the terminal apparatus in response to a response from the terminal apparatus indicating that the apparatus identification information for identifying the terminal apparatus matches apparatus identification information of the terminal apparatus, and in response to determining that a notification, which indicates that the processing result has not been acquired for any of respective processing in the distributed processing, is received from the terminal apparatus and at least one of the processing related to the notification is distributed to the server, executes the processing that is newly distributed and transmits the processing result to the terminal apparatus.

9. The distributed processing system according to claim 8, wherein each server in the plurality of servers store in advance target data of all processing related to the distributed processing, and execute the processing by using target data of processing distributed to the server from the stored target data.

10. The distributed processing system according to claim 9, further comprising:

a management server that manages distribution of the distributed processing with respect to the servers, wherein in response to determining that each server in the plurality of servers receives the notification, the management server distributes processing, which is specified by the notification, to a server different from the server to which the processing is distributed.

11. The distributed processing system according to claim 9, wherein in response to determining that each server in the plurality of servers receives the notification, each server determines the server, which executes a processing specified by the notification, by communicating with the other servers.

12. The distributed processing system according to claim 8, wherein each server in the plurality of servers transmits the apparatus identification information to the terminal apparatus in response to determining that communication for acquiring the processing result is started between each server and the terminal apparatus, and transmits the apparatus identification information again in response to determining that the processing result is transmitted to the terminal apparatus.

13. The distributed processing system according to claim 12, wherein in response to determining that each server in the plurality of servers transmits the processing result to the terminal apparatus, each server transmits the apparatus identification information together with the processing result.

14. A non-transitory computer readable medium storing a program causing a computer to execute:

a function of providing an execution instruction for processing and apparatus identification information of an information processing apparatus to a plurality of servers that execute distributed processing;

a function of receiving identification information of the processing and the apparatus identification information of the information processing apparatus from each of the plurality of servers and acquiring a processing result of the processing identified by the identification information of the processing acquired together with the apparatus identification information from the server that is a transmission source of the apparatus identification information;

a function of repeating to provide, in response to determining that a predetermined condition is satisfied without acquiring the processing result for respective processing related to the distributed processing, a notification indicating that the processing result has not been acquired to each of the plurality of servers that executes the distributed processing;

a function of determining whether a number of times of the notification has reached a predetermined number of times; and a function of receiving, in response to determining that the number of times of the notification has not reached the predetermined number of times, the apparatus identification information of the information processing apparatus from any server in the servers that execute the distributed processing and acquiring the processing result that has not been acquired in response to determining that the condition is satisfied.

15. A distributed processing method comprising:

providing an execution instruction for processing and apparatus identification information of an information processing apparatus to a plurality of servers that execute distributed processing;

receiving identification information of the processing and the apparatus identification information of the information processing apparatus from each of the plurality of servers and acquiring a processing result of the processing identified by the identification information of the processing acquired together with the apparatus identification information from the server that is a transmission source of the apparatus identification information;

repeating to provide, in response to determining that a predetermined condition is satisfied without acquiring the processing result for respective processing related to the distributed processing, a notification indicating that the processing result has not been acquired to each of the plurality of servers that executes the distributed processing;

determining whether a number of times of the notification has reached a predetermined number of times; and receiving, in response to determining that the number of times of the notification has not reached the predetermined number of times, the apparatus identification information of the information processing apparatus from any server in the servers that execute the distributed processing and acquiring the processing result that has not been acquired in response to determining that the condition is satisfied.

* * * * *